UNITED STATES PATENT OFFICE.

CHARLES RICHTER, OF ST. PAUL, MINNESOTA, ASSIGNOR TO PETER R. L. HARDENBERGH, FERDINAND WILLINS, GUSTAV WILLINS, AND A. O. BAILEY, OF SAME PLACE.

PROCESS OF PREPARING A SOLUTION FOR TAWING HIDES AND SKINS.

SPECIFICATION forming part of Letters Patent No. 260,322, dated June 27, 1882.

Application filed January 9, 1882. (No specimens.)

*To all whom it may concern:*

Be it known that I, CHARLES RICHTER, of St. Paul, in the county of Ramsey and State of Minnesota, have invented a new and useful Improvement in Process of Preparing a Solution for Tawing Hides and Skins, of which the following is a specification.

The composition is prepared as follows: Fill a barrel or other vessel half-full of clay, preferably clay suitable for making bricks. Then add water sufficient to reduce the clay to a plastic mass, destroying its adhesive qualities and forming a thick liquid. Then mix therewith the following ingredients in substantially the following proportions, viz: To every thirty-two gallons of clay and water mixture add four quarts of common salt and one pint of sulphuric acid. After an hour or two add also one quart of brewers' yeast, and thoroughly incorporate them. An effervescence will ensue and continue for about twenty-four hours, and when it ceases the liquid compound will begin to precipitate. When precipitated separate the impurities and the supernatant water and put the latter in a barrel. Then fill the barrel or other vessel with water and dissolve therein six ounces of alum to every thirty-two gallons of liquid.

The composition thus prepared will be useful in tawing hides and skins, and also useful in tawing and coloring hides and skins in the manner set forth in other applications which are intended to be simultaneously issued in Letters Patent of the same date herewith.

This patent is intended only to cover the process of preparing the solution. The other patents are intended to cover the modes of using the solution in the entire processes covered thereby.

Salt and alum have been used in tawing leather to form a subchloride of aluminium in manner well known among tanners. My invention consists in combining with articles heretofore used for producing a subchloride of aluminium clay and other ingredients, as hereinbefore set forth, precipitating the solid impurities, and purifying the liquid residuum.

What I claim as my invention, and desire to secure by Letters Patent, is—

The process of preparing the solution aforesaid by mixing water, common salt, clay, sulphuric acid, brewers' yeast, and alum, substantially as set forth.

CHARLES RICHTER.

In presence of—
WALTER H. SANBORN,
GEO. W. RUSSELL.